(12) United States Patent
Barker et al.

(10) Patent No.: US 6,392,385 B1
(45) Date of Patent: May 21, 2002

(54) BATTERY OPERATION FOR EXTENDED CYCLE LIFE

(76) Inventors: Jeremy Barker, 15709 NE. 98th Way, Redmond, WA (US) 98052; Feng Gao, 8819 Castlebury Ct., Laurel, MD (US) 20733

(*) Notice: Subject to any disclaimer, the term of this patent is extended or adjusted under 35 U.S.C. 154(b) by 0 days.

(21) Appl. No.: 09/452,267

(22) Filed: Dec. 1, 1999

(51) Int. Cl.$^7$ .............................................. H01M 10/44
(52) U.S. Cl. ...................................... 320/130; 320/131
(58) Field of Search ................................ 320/100, 125, 320/128, 129, 130, 131, 160

(56) References Cited

U.S. PATENT DOCUMENTS

| | | | |
|---|---|---|---|
| 5,179,337 A | | 1/1993 | Staarman et al. |
| 5,196,279 A | | 3/1993 | Tarascon |
| 5,283,511 A | * | 2/1994 | Keener et al. |
| 5,304,916 A | * | 4/1994 | Le et al. |
| 5,334,925 A | * | 8/1994 | Kendrick |
| 5,432,425 A | | 7/1995 | Lundquist et al. |
| 5,436,549 A | | 7/1995 | Lundquist et al. |
| 5,500,583 A | | 3/1996 | Buckley et al. |
| 5,550,454 A | | 8/1996 | Buckley |
| 5,557,188 A | | 9/1996 | Piercey |
| 5,600,227 A | * | 2/1997 | Smalley |
| 5,635,815 A | * | 6/1997 | Whitchurch et al. |
| 5,770,018 A | | 6/1998 | Saidi |
| 5,897,973 A | | 4/1999 | Stephenson et al. |

OTHER PUBLICATIONS

Proceedings of the Third Annual Portable by Design Conference, Mar. 25–29, 1996, Santa Clara Convention Center, Santa Clara, California; "Designing Lithium–Ion Batteries into Today's Portable Products," by Marc W. Juzkow and Chris St. Louis, Moli Energy (1990) Limited, pp. 13–22; "System Considerations for Lithium–Ion Batteries," by N. Lynn Bowen and Dnyanesh Patkar, National Semiconductor Corporation, pp. 179–191; and "Characterization of Lithium–Ion Batteries for Fuel Gauging," by Mark Reid and Marc W. Juzkow, Moli Energy 1990 Limited, pp. 292–298.

"Three Electrode Electrochemical Voltage Spectroscopy (TEVS): Evaluation of a Model Lithium Ion System," by J. Barker, Valence Technology, Inc., 301 Conestoga Way, Henderson, NV 89015, *Electrochima Acta.*, vol. 40 No. 11, 1995, pp. 1603–1608.

"Structural Fatigue in Spinel Electrodes in High Voltage (4V) Li/Li$_x$Mn$_2$O$_4$ Cells," by Thackeray et al., *Electrochemical and Solid–State Letters*, 1 (1) (1998), pp. 7–9.

Handbook of Batteries by David Linden, Second Edition, McGraw–Hill, Inc., 1995, pp. 3.5–3.6.

\* cited by examiner

*Primary Examiner*—Edward H. Tso

(57) ABSTRACT

The present invention provides a method for cycling a battery, containing lithium metal oxide, particularly lithium manganese oxide (LMO) active material, in a cell in a manner which reduces the extent to which loss of capacity occurs. The present method of operation extends the cycle life of such battery.

17 Claims, 4 Drawing Sheets

BATTERY OPERATION FOR EXTENDED CYCLE LIFE

FIELD OF THE INVENTION

This invention relates to electrochemical cells and batteries, and more particularly, to such cells and batteries having lithium-based active material.

BACKGROUND OF THE INVENTION

Lithium batteries are prepared from one or more lithium electrochemical cells. Such cells have included an anode (negative electrode), a cathode (positive electrode), and an electrolyte interposed between the positive and negative electrodes. The electrolyte provides transport of electrolyte positive ions and separates the positive and negative electrodes from one another. Thus, the designation electrolyte/separation is used. The electrolyte typically comprises a salt of lithium dissolved in one or more solvents, typically nonaqueous (aprotic) organic solvents. By convention, during discharge of the cell, the negative electrode of the cell is defined as the anode. During use of the cell, lithium ions (Li+) are transferred to the negative electrode on charging. During discharge, lithium ions (Li+) are transferred from the negative electrode (anode) to the positive electrode (cathode). Upon subsequent charge and discharge, the lithium ions (Li+) are transported between the electrodes. Cells having metallic lithium anode and metal chalcogenide cathode are charged in an initial condition. During discharge, lithium ions from the metallic anode pass through the liquid electrolyte to the electrochemically active material of the cathode whereupon electrical energy is released. During charging, the flow of lithium ions is reversed and they are transferred from the positive electrode active material through the ion conducting electrolyte and then back to the lithium negative electrode.

The lithium metal anode has been replaced with a carbon anode, that is, a carbonaceous material, such as non-graphitic amorphous coke, graphitic carbon, or graphites, which are intercalation compounds. This presents a relatively advantageous rechargeable lithium battery in which lithium metal is replaced with a material capable of reversibly intercalating lithium ions, thereby providing the "rocking chair" battery in which lithium ions "rock" between the intercalation electrodes during the charging/discharging/recharging cycles. Such lithium metal free cells may thus be viewed as comprising two lithium ion intercalating (absorbing) electrode "sponges" separated by the lithium ion conducting electrolyte/separator. The electrolyte/separator usually comprises a lithium salt dissolved in nonaqueous solvent or a mixture of such solvents. Numerous such electrolytes, salts, and solvents are known in the art.

Preferred positive electrode active materials include $LiCoO_2$, $LiMn_2O_4$, and $LiNiO_2$. The cobalt compounds are relatively expensive and the nickel compounds are difficult to synthesize. A relatively economical positive electrode is $LiMn_2O_4$, prepared by reacting generally stoichiometric quantities of a lithium-containing compound and a manganese containing compound. The lithium cobalt oxide ($LiCoO_2$), the lithium manganese oxide ($LiMn_2O_4$), and the lithium nickel oxide ($LiNiO_2$) all have a common disadvantage in that the charge capacity of a cell comprising such cathodes suffers a significant loss in capacity. That is, the initial capacity available (amp hours/gram) from $LiMn_2O_4$, $LiNiO_2$, and $LiCoO_2$ is less than the theoretical capacity because less than 1 atomic unit of lithium engages in the electrochemical reaction. Such an initial capacity value is significantly diminished during the first cycle operation and such capacity further diminishes (fades) on every successive cycle of operation. The specific capacity for $LiMn_2O_4$ is at best 148 milliamp hours per gram. As described by those skilled in the field, the observed reversible capacity is on the order of 60% of the aforesaid value. Obviously, there is a tremendous difference between the theoretical capacity (assuming all lithium is extracted from $LiMn_2O_4$) and the actual capacity when much less than one atomic unit of lithium is extracted as observed during operation of a cell.

Capacity fading is calculated according to the equation given below. The equation is used to calculate the first cycle capacity loss. This same equation is also used to calculate subsequent progressive capacity loss during subsequent cycling relative back to the first cycle capacity charge reference.

$$\frac{((FC \text{ charge capacity}) - (FC \text{ discharge capacity})) \times 100\%}{FC \text{ charge capacity}}$$

In view of the present state of the art, there remains the difficulty of utilizing lithium manganese oxide based electrode materials over an extended cycle life due to the disadvantage of significant capacity loss on progressive cycling.

SUMMARY OF THE INVENTION

The present invention provides a method for cycling a battery containing lithium metal oxide active material, such as lithium manganese oxide (LMO) in a cell in a manner which reduces the extent to which loss of capacity occurs. The method of the invention is conducted by performing at least one initial conditioning charge and discharge cycle wherein the initial conditioning charge is preferably to essentially the design voltage of the battery and discharge is preferably to essentially the full depth of discharge; charging the conditioned battery preferably to essentially the full charge, and then discharging the battery to greater than 90% and less than 100% of the full depth of discharge. In a preferred embodiment of the invention method, the charge and discharge cycles are repeated in sequence, preferably up to four conditioning cycles. The cycling regime after conditioning is to depth of discharge greater than 95% and less than 99% of the full depth of discharge.

According to another feature of the invention, the step of discharging the charged battery is conducted to a discharge voltage greater than about 3.4 volts at a temperature of about 50° C. or more. Alternatively, the discharge step is conducted to a discharge voltage greater than about 3.6 volts and at a temperature of about 50° C. or more.

According to a further aspect of the invention, the conditioned battery is charged at a charge rate of C/2, and a discharge rate of C/5 is used. This charge/discharge cycling regime provides a greatly increased cycle life over the traditionally used C/2 charge and C/2 discharge rates.

DETAILED DESCRIPTION OF THE PREFERRED EMBODIMENTS

Figure 1A:
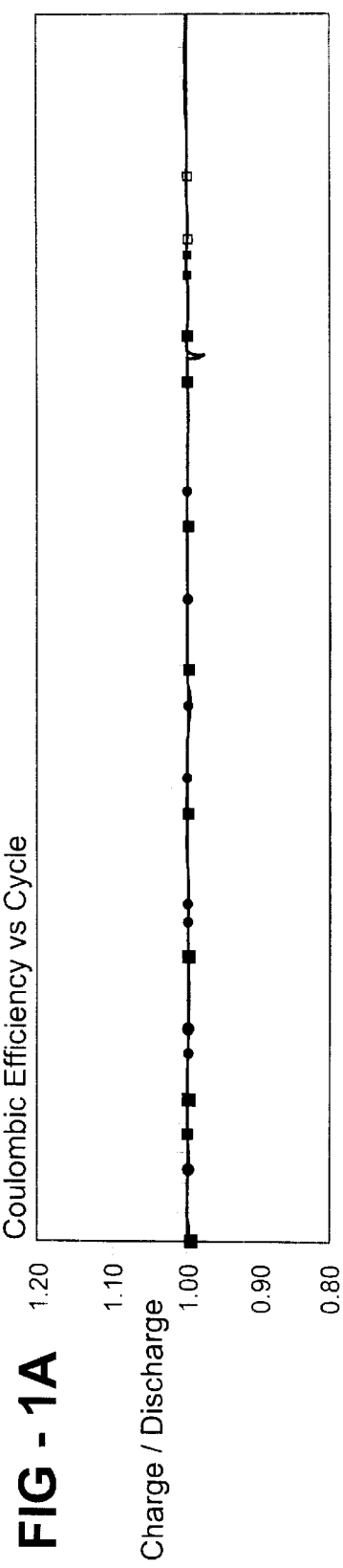
FIG. 1A is Coulombic Efficiency and 1B is Discharge Capacity, each versus Cycles. The cells were cycled for up to 350 cycles. After an initial conditioning charge, the stack was cycled between the charged state design voltage of about 4.2 volts and to a discharge state (low voltage cut-off) that varied from the conventional 3.0 volts. The low voltage cut-off values are 3.0V, 3.15V, 3.30V, 3.50V, 3.60V, 3.70V, and 3.75V. The stack was cycled at 60° C., with a two hour discharge rate (C/2) and a two hour charge rate (C/2). There was an additional potentiostatic period at 4.2 volts until current drops to 10% of the C/2 rate. The geometric surface area of each of the positive electrodes was about 180 square centimeters, for a total of 720 square centimeters.

In a cell which comprises a lithium metal oxide active material, the cycling life of the cell is often limited. This is particularly seen with the lithium manganese oxide spinel cathode active material. Lithium manganese oxide spinel cathode active material is typically, conventionally, cycled against a counter-electrode from an upper voltage in a range of 4 to 4.5 volts to a lower range of 3 volts or less than 3 volts. This can be seen, for example, in U.S. Pat. No. 5,196,279 (Tarascon) where $Li_xMn_2O_4$ (0<x<1) is cycled between about 2 and 4.5 volts with progressive capacity loss through 25 cycles. Here, only 25 cycles are shown. Typically, capacity loss continues to occur progressively after 25 cycles. See also U.S. Pat. No. 5,770,018 (Saidi) showing cycling of lithium manganese oxide spinel between 3 and 4.3 volts.

The present invention provides a method for cycling a battery, containing lithium manganese oxide (LMO) active material, in a cell in a manner which reduces the extent to which loss of capacity occurs. The present method of operation extends the cycle life of such battery having LMO active material. The method of the invention is conducted by performing at least one initial conditioning charge and discharge cycle. Desirably, up to 4 conditioning cycles are completed. The initial conditioning charge is up to the design voltage of the cell and the initial conditioning discharge is to essentially full, 100%, depth of discharge (DOD). Next, the previously conditioned battery is charged. Then the charged battery is discharged to greater than 90% and less than 100% depth of discharge. Preferably, after initial conditioning, the battery is cycled between its design voltage condition, and the depth of discharge greater than 95% and less than 99% depth of discharge. More preferably, based on a design voltage of about 4.2 volts and a fully discharge condition of 3 volts, the battery is conditioned and then cycled to a low voltage cut-off of 3.7 volts, which is considerably higher than the typical low voltage cut-off of 3 volts, at a nominal temperature in its operating environment of 60° C. Therefore, when the operating temperature is about 60° C. the low voltage cut-off is 3.6 to 3.7 volts. Preferably, at an operating temperature of 50° C., the low voltage cut-off is about 3.4 to 3.5 volts.

In another aspect, an optimized charge/discharge cycling regime is used. The new cycling regime differs from the typical ± C/2 charge and discharge rate. The new cycling regime is preferably used along with the above-described voltage cut-off conditions. According to the invention, a C/2 charge rate and a C/5 discharge rate are used. Those skilled in the art will understand that the C rate indicates the rate at which the cell or battery is charged and discharged. A rate of C/2 indicates that the battery was charged over a 2 hour period. A rate of C/5 indicates that the battery was discharged over a 5 hour period.

Before further describing the invention, it is useful to understand the physical characteristics of the $LiMn_2O_4$ (LMO) used in a cell having design voltage as described herein. The nominal general formula $LiMn_2O_4$ represents a relatively narrow range of spinel lithium manganese oxide compounds (referred to as LMO) which have stoichiometry that varies somewhat in the relative proportion of lithium, manganese and oxygen, but still having the spinel structure. Oxygen deficient spinels are not favored here. Relatively lithium rich spinels are favored here. One desirable range or compositions is the spinel formula $Li_{1+x}Mn_{2-x}O_4$ where $0<x\leq0.5$. Lithium deficient spinels with x less than 0 (i.e., −0.2) are also known. In the experiments below, an untreated spinel lithium manganese oxide had a surface area of about 0.9 $m^2/g$; average particle size of about 30 microns; lithium content of about 4%; less than 1% impurities and lattice parameter of 8.22. The preferred lithium-rich spinel is prepared from a precursor spinel lithium manganese oxide. The precursor spinel preferably has the formula $Li_{1+x1}Mn_{2-x1}O_4$, $0\leq x1\leq 0.05$; and the lithium-rich spinel treated as per the invention Example I has the formula $Li_{1+x2}Mn_{2-x2}O_4$ where $x1\leq x2\leq 0.20$. Preferably, the lithium-rich spinel is represented by $Li_{1+x}Mn_{2-x}O_4$, where $0.81\leq x\leq 0.20$, desirably $0.09\leq x\leq 0.2$ and preferably $0.1\leq x\leq 0.2$.

It should be noted that for a lithium ion cell having lithium manganese oxide spinel (LMO) cathode material and graphite anode material, in as prepared condition, the cell is not charged. During initial charge on the first cycle, lithium ions are deintercalated from the LMO. At a design charge voltage, depending on the configuration of the cell between about 4.10 to 4.20 volts, about 0.72 atomic units of lithium has been removed or deintercalated per formula unit of the original LMO. This constitutes an essentially fully charge condition, design voltage condition. The deintercalation is equivalent to about 106 milliamp hours per gram of the total LMO active material. Next, the cell is discharged and a quantity close to 0.64 atomic units of lithium is reinserted into the LMO. The reinsertion corresponds to approximately 95 milliamp hours per gram. Importantly, on full depth of discharge, nearly all of the lithium removed from the LMO on charge has been reinserted on discharge. The full depth of discharge constitutes a nominal low voltage cut-off of about 3 volts for the nominal lithium LMO cell.

In the invention, an initial conditioning charge occurs between the stated design voltage (4.10 to 4.20 volts nominally) and the 100% depth of discharge cut-off voltage, nominally 3 volts for LMO cells. It has been determined that elevating the low voltage cut-off point, after initial conditioning, significantly affects the cycle life of the cell.

Cells (batteries) were prepared and operated according to the preferred charge and discharge regime of the invention. The results of testing are shown in FIGS. 1–3. The basic configuration of such cells and the nature of the LMO used therein will now be described.

Figure 4:
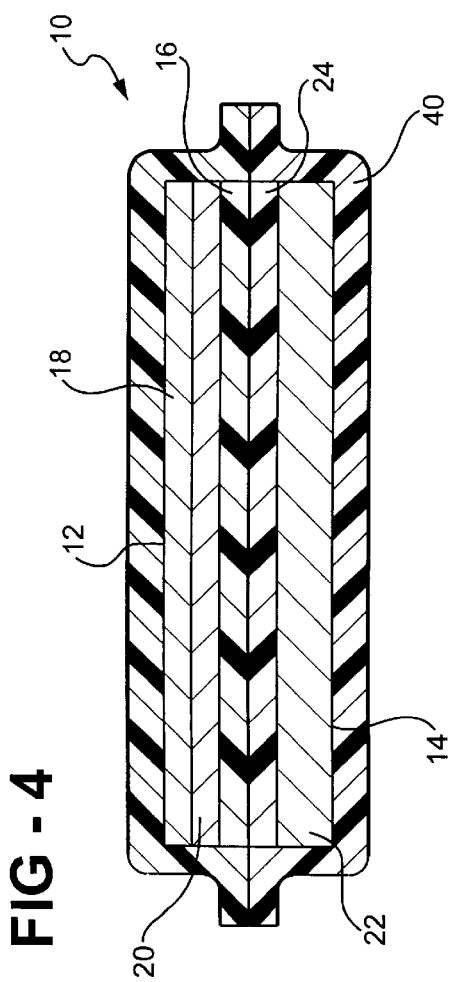
FIG. 4 is a diagrammatic representation of a typical laminated lithium-ion battery cell structure.

A typical laminated battery cell structure 10 is depicted in FIG. 4. It comprises a negative electrode side 12, a positive electrode side 14, and an electrolyte/separator 16 there between. Negative electrode side 12 includes current collector 18, and positive electrode side 14 includes current collector 22. A copper collector foil 18, preferably in the form of an open mesh grid, upon which is laid a negative electrode membrane 20 comprising an intercalation material such as carbon or graphite or low-voltage lithium insertion compound, dispersed in a polymeric binder matrix. An electrolyte/separator film 16 membrane is preferably a plasticized copolymer. This electrolyte/separator preferably comprises a polymeric separator and a suitable electrolyte for ion transport. The electrolyte/separator is positioned upon the electrode element and is covered with a positive electrode membrane 24 comprising a composition of a finely divided lithium intercalation compound in a polymeric binder matrix. An aluminum collector foil or grid 22 completes the assembly. Protective bagging material 40 covers the cell and prevents infiltration of air and moisture.

Figure 5:
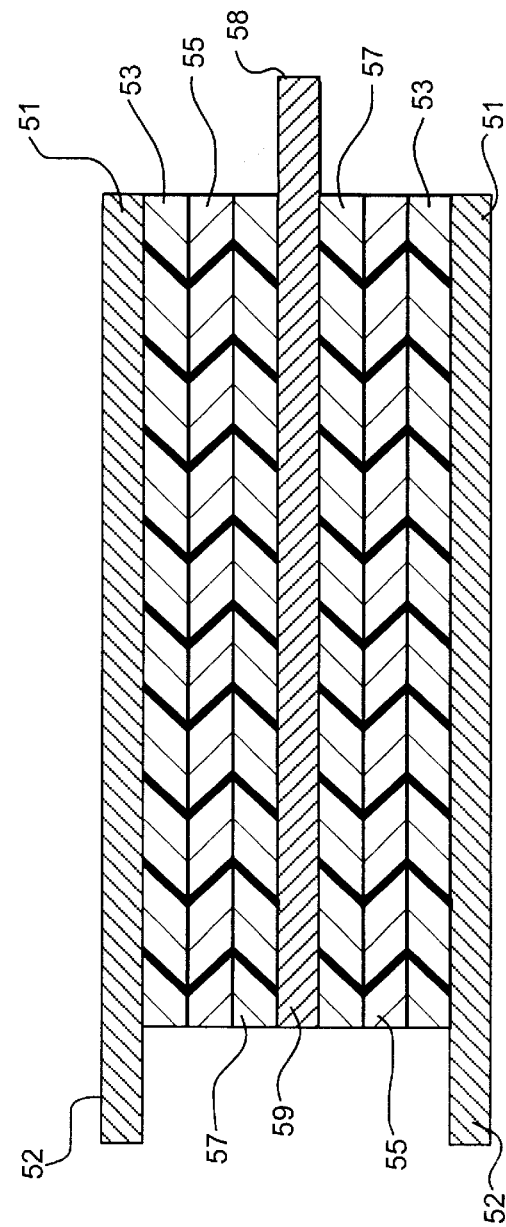
FIG. 5 is a diagrammatic representation of a typical multi-cell battery cell structure.

In another embodiment, a multi-cell battery configuration as per FIG. 5 is prepared with copper current collector 51, negative electrode 53, electrolyte/separator 55, positive electrode 57, and aluminum current collector 59. Tabs 52 and 58 of the current collector elements form respective terminals for the battery structure. As used herein, the terms "cell" and "battery" refer to an individual cell comprising anode/electrolyte/cathode and also refer to a multi-cell arrangement in a stack.

The relative weight proportions of the components of the positive electrode are generally: 50–90% by weight active material; 5–30% carbon black as the electric conductive diluent; and 3–20% binder chosen to hold all particulate materials in contact with one another without degrading ionic conductivity. Stated ranges are not critical, and the amount of active material in an electrode may range from 25–95 weight percent. The negative electrode comprises about 50–95% by weight of a preferred graphite, with the balance constituted by the binder. A typical electrolyte separator film comprises approximately two parts polymer for every one part of a preferred fumed silica. The conductive solvent comprises any number of suitable solvents and salts. Desirable solvents and salts are described in U.S. Pat. Nos. 5,643,695 and 5,418,091. One example is a mixture of EC:DMC:LiPF$_6$ in a weight ratio of about 60:30:10.

Solvents are selected to be used individually or in mixtures, and include dimethyl carbonate (DMC), diethylcarbonate (DEC), dipropylcarbonate (DPC), ethylmethylcarbonate (EMC), ethylene carbonate (EC), propylene carbonate (PC), butylene carbonate, lactones, esters, glymes, sulfoxides, sulfolanes, etc. The preferred solvents are EC/DMC, EC/DEC, EC/DPC and EC/EMC. The salt content ranges from 5% to 65% by weight, preferably from 8% to 35% by weight.

Those skilled in the art will understand that any number of methods are used to form films from the casting solution using conventional meter bar or doctor blade apparatus. It is usually sufficient to air-dry the films at moderate temperature to yield self-supporting films of copolymer composition. Lamination of assembled cell structures is accomplished by conventional means by pressing between metal plates at a temperature of about 120–160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

Separator membrane element 16 is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are particularly suitable. Inorganic filler adjuncts, such as fumed alumina or silanized fumed silica, may be used to enhance the physical strength and melt viscosity of a separator membrane and, in some compositions, to increase the subsequent level of electrolyte solution absorption.

In the construction of a lithium-ion battery, a current collector layer of aluminum foil or grid is overlaid with a positive electrode film, or membrane, separately prepared as a coated layer of a dispersion of intercalation electrode composition. This is typically an intercalation compound such as LiMn$_2$O$_4$ (LMO), LiCoO$_2$, or LiNiO$_2$, powder in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

Examples of forming cells containing metallic lithium anode, intercalation electrodes, solid electrolytes and liquid electrolytes can be found in U.S. Pat. Nos. 4,668,595; 4,830,939; 4,935,317; 4,990,413; 4,792,504; 5,037,712; 5,262,253; 5,300,373; 5,435,054; 5,463,179; 5,399,447; 5,482,795 and 5,411,820; each of which is incorporated herein by reference in its entirety. Note that the older generation of cells contained organic polymeric and inorganic electrolyte matrix materials, with the polymeric being most preferred. The polyethylene oxide of 5,411,820 is an example. More modern examples are the VdF:HFP polymeric matrix. Examples of casting, lamination and formation of cells using VdF:HFP are as described in U.S. Pat. Nos. 5,418,091; 5,460,904; 5,456,000; and 5,540,741; assigned to Bell Communications Research, each of which is incorporated herein by reference in its entirety.

As described earlier, the electrochemical cell operated as per the invention, may be prepared in a variety of ways. In one embodiment, the negative electrode may be metallic lithium. In more desirable embodiments, the negative electrode is an intercalation active material, such as, metal oxides and graphite. When a metal oxide active material is used, the components of the electrode are the metal oxide, electrically conductive carbon, and binder, in proportions similar to that described above for the positive electrode. In a preferred embodiment, the negative electrode active material is graphite particles. For test purposes, test cells are often fabricated using lithium metal electrodes. When forming cells for use as batteries, it is preferred to use an intercalation metal oxide positive electrode and a graphitic carbon negative electrode. In the examples below, all test cells contained graphitic carbon active materials. None of the carbon anodes were pre-lithiated prior to assembly in a cell. Various methods for fabricating electrochemical cells and batteries and for forming electrode components are described herein. The invention is not, however, limited by any particular fabrication method.

EXAMPLE I

Formation of Preferred LMO Active Material

Lithium manganese oxide spinel (LMO) was obtained from Japan Energy Corporation having the specifications as per Table I, and designated Japan Energy Corporation ISR 140B. The LMO was treated to optimize performance as per the following steps. The procedure begins with mixing LMO and lithium carbonate by ball milling for 60 minutes. A low level (1–2 weight percent) of high purity lithium carbonate around 5 micron particle size is used. Such lithium carbonate is available from Pacific Lithium, New Zealand. Large ceramic media was used for this operation. This caused no attrition of the material. The media was then removed from the mixture. The mixed $Li_2CO_3$/LMO was heated in a Box Furnace, set at between 600–750° C., for 30 minutes. The treated material was removed from the furnace and immediately transferred to a second Box Furnace set at 450° C. for 1 hour. This furnace had a good supply of flowing air throughout to minimize oxygen deficiency and to overcome the tendency of LMO to lose oxygen at about 700° C. or higher. The treated material was then removed from the second furnace and allowed to cool to room temperature. The color change of the LMO as per Table III is of interest. The treated LMO has a slight red color, and this differs from the untreated LMO which is grey/black. A material of the formula $Li_2MnO_3$ is known to be red in color. The treated product is thought to include cations of lithium bound to the spinel particles at least at the external surface.

EXAMPLE II

Formation and Testing of Cells

A graphite electrode was fabricated by solvent casting a slurry of MCMB2528 graphite, binder, plasticizer, and casting solvent. MCMB2528 is a mesocarbon microbead material supplied by Alumina Trading, which is the U.S. distributor for the supplier, Osaka Gas Company of Japan. This material has a density of about 2.24 grams per cubic centimeter; a particle size maximum for at least 95% by weight of the particles of 37 microns; median size of about 22.5 microns and an interlayer distance of about 0.336. The binder was a copolymer of polyvinylidene difluoride (PVDF) and hexafluoropropylene (HFP) in a wt. ratio of PVDF to HFP of 88:12. This binder is sold under the designation of Kynar Flex 2801®, showing it's a registered trademark. Kynar Flex is available from Atochem Corporation. An electronic grade solvent was used. The slurry was cast onto glass and a free standing electrode was formed as the casting solvent evaporated. The electrode composition was approximately as follows on a dry weight % basis: 70 graphite; 9.5 binder; 17.5 plasticizer and 3.0 conductive carbon.

An electrode cathode was also fabricated by solvent casting a slurry of heat treated lithium manganese oxide, conductive carbon, binder, plasticizer, and solvent. The conductive carbon used was Super P (MMM carbon), Kynar Flex 2801® was used as the binder along with a plasticizer, and electronic grade acetone was used as the solvent. The slurry was cast onto aluminum foil coated with polyacrylic acid/conductive carbon mixture. The slurry was cast onto glass and a free standing electrode was formed as the solvent was evaporated. The cathode electrode composition was approximately as follows on a dry weight % basis: 72.9 treated LMO; 3.0 carbon, 8.1 binder; and 16.0 plasticizer. In a preferred method, prior to cell construction the plasticizer is extracted.

A rocking chair battery was prepared comprising the anode, the cathode, and an electrolyte. The ratio of the active cathode mass to the active anode mass was about 2.72. The two electrode layers were arranged with an electrolyte layer in between, and the layers were laminated together using heat and pressure as per the Bell Comm. Res. patents incorporated herein by reference earlier. In a preferred method, the cell is activated with EC/DMC (2:1 by weight) solvent solution containing 1 M $LiPF_6$ salt.

TABLE I

|  | BEFORE | TREATED LMO[1] |
| --- | --- | --- |
| Surface Area/m²/g | 0.8505 | 0.6713 |
| d10 | 10.74 | 8.59 |
| d50 volume % | 31.12 | 28.13 |
| d97 | 69.84 | 63.68 |
| Li content/wt % | 4.05 | 4.26 |
| Lattice Constant a (Å) | 8.2158 | 8.2105 |
| x in $Li_{1+x}Mn_{2-x}O_4$ (From XRD)* | 0.086 | 0.112 |
| Residual $Li_2CO_3$ | 0 | 0.26% |
| Oxygen Deficiency | 0 | 0.03% |
| Color | Grey/Black | Slight Red Color |

*XRD = x-ray diffraction
[1]Treated LMO: Heated at 750° C. 98.33% LMO + 1.67% $Li_2CO_3$ (By Weight)

TABLE II

| Low Voltage Cut-Off | 1st Cycle Amps | DOD* |
| --- | --- | --- |
| 3.0 V | 3.1 | 100 |
| 3.5 V | 3.05 | 98.4 |
| 3.6 V | 2.85 | 91.9 |

TABLE II-continued

| Low Voltage Cut-Off | 1st Cycle Amps | DOD* |
|---|---|---|
| 3.7 V | 2.75 | 88.7 |
| 3.75 V | 2.65 | 85.5 |

*Depth of Discharge

Cells prepared in accordance with Examples I and II were conditioned by performing at least one initial conditioning charge and discharge cycle. The initial conditioning charges up to the design voltages of the cell, here, nominally 4.2 volts. The initial conditioning discharge is to essentially to full, 100% depth of discharge, here essentially 3.0 volts. Next, the previously conditioned cells were cycled for at least 100 cycles and up to about 350 cycles using different low voltage cut-off points. As shown in FIG. 1, parts 1A and 1B, and as summarized in Table II. These cells were cycled at 60° C. with a C/2 charge rate and a C/2 discharge rate. As can be seen in FIG. 1, the cells cycles at the nominal 3.0 volt, low volt discharge cut-off, demonstrated a rapid decline in capacity between about 100 and 150 cycles. The same poor life cycle due to capacity loss was observed for cells cycled at 3.15 volts and 3.30 volts, low voltage cut-off. The cells cycled to a low voltage cut-off of 3.5 volts demonstrated improved life cycle capacity with significant decline only occurring well after 150 cycles and close to 200 cycles. Thus 3.5 low voltage cut-off was an improvement when compared to the aforementioned 3 cells cycled down to a discharge of 3.0, 3.15, and 3.30 volts, respectively. Dramatic and unexpected improved results in life cycle capacity was demonstrated by cells cycled to a low voltage cut-off, discharge voltage, of 3.6 volts, 3.7 volts, and 3.75 volts. These latter 3 cells demonstrated good life cycle capacity retention for over 250 cycles and would have cycled beyond 350 cycles had the testing not been discontinued. It is evident from FIG. 1B that low voltage cut-off at 3.5 volts or higher shows much better cycle life behavior with little decline in capacity. Therefore, FIG. 1B demonstrates the heretofore unexpected result that if the low voltage cut-off point is set higher, the life cycle of the cell is dramatically increased with little sacrifice in capacity.

Figure 1B:
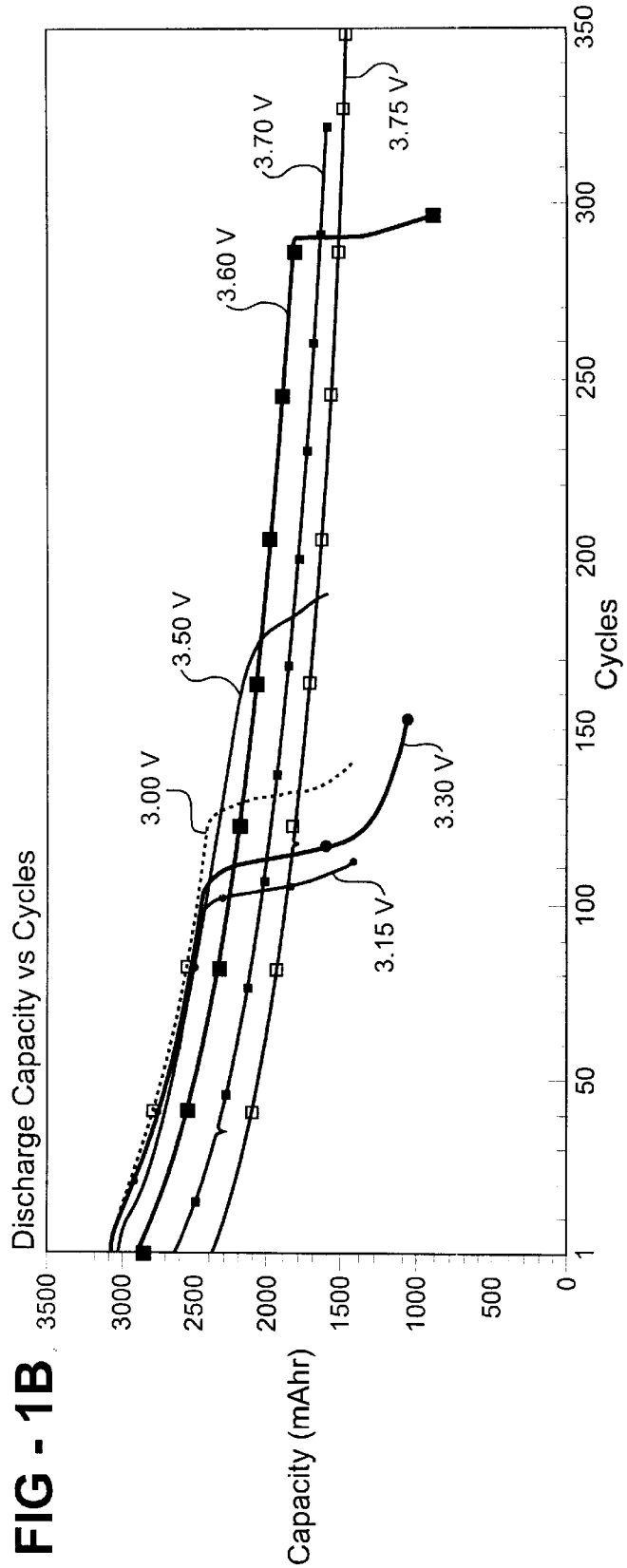
FIG. 1 is a two-part graph showing the results of testing 4 cells in a bi-cell arrangement, also referred to as a stack, having an anode comprising MCMB active material cycled with a counter-electrode comprising treated lithium manganese oxide active material as per the Examples presented herein.

FIG. 1A demonstrates that the charge/discharge ratio for all cells remain close to unity indicating the excellent Coulombic reversibility for all cells in the test.

Figure 2A:
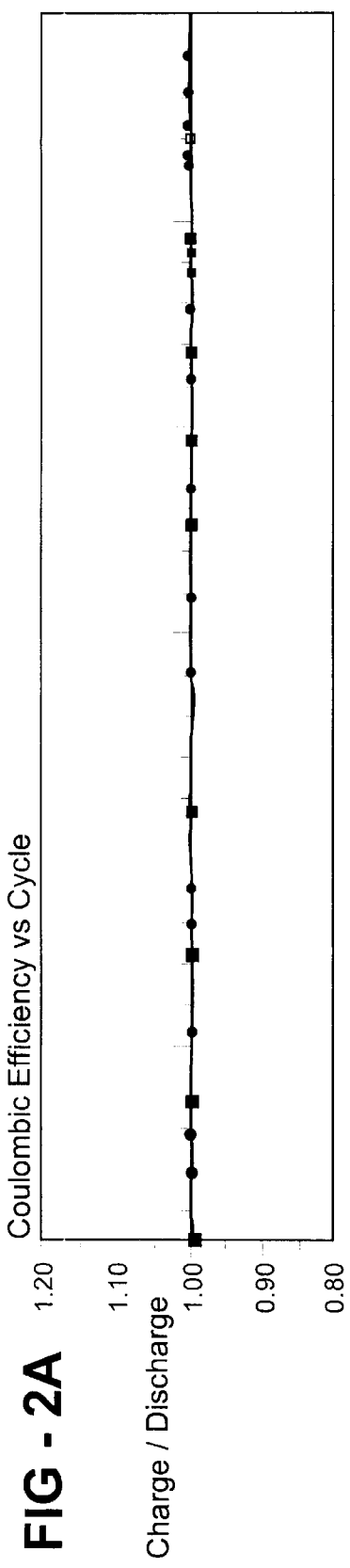
FIG. 2 is a two part graph with parts 2A and 2B representing test results for Coulombic Efficiency and Discharge Capacity similar to FIGS. 1A and 1B. The preferred higher, low voltage cut-off values of 3.6V, 3.7V and 3.75V are shown, for cells prepared and cycled as described for FIG. 1.
Figure 2B:
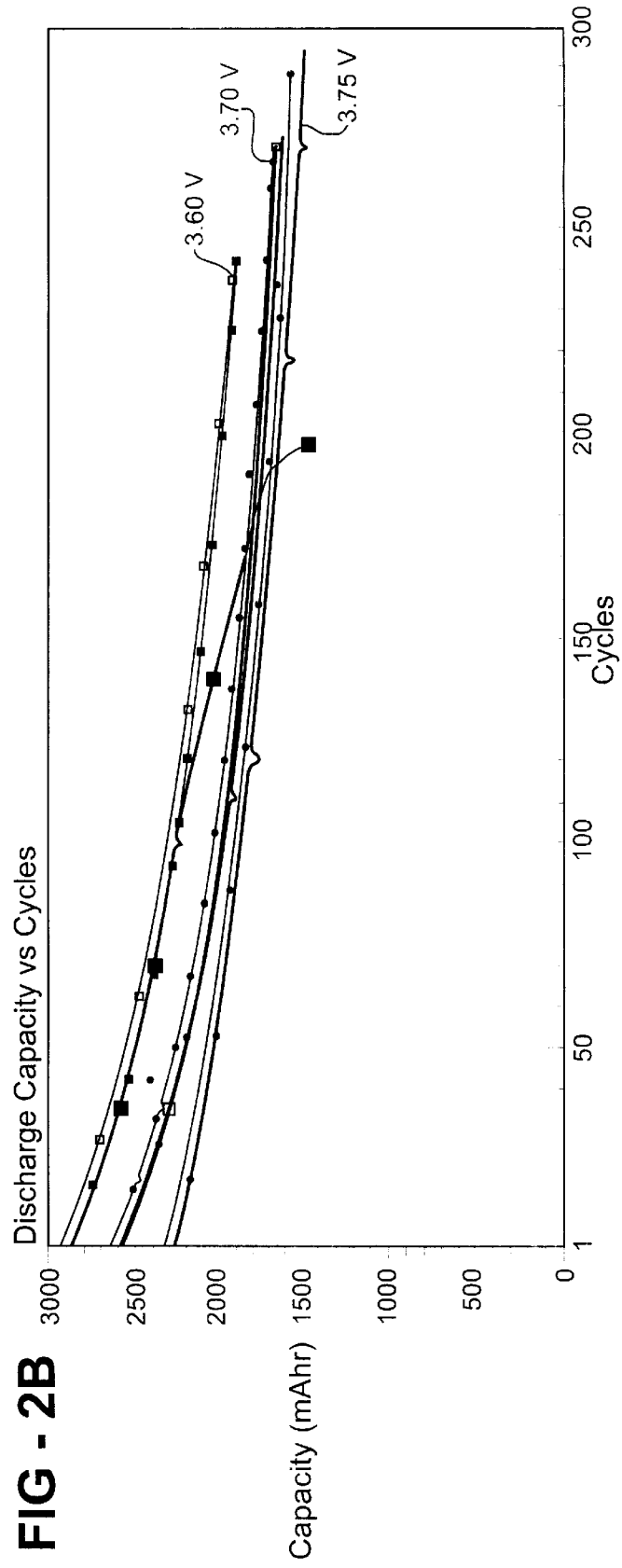
Figure 3:
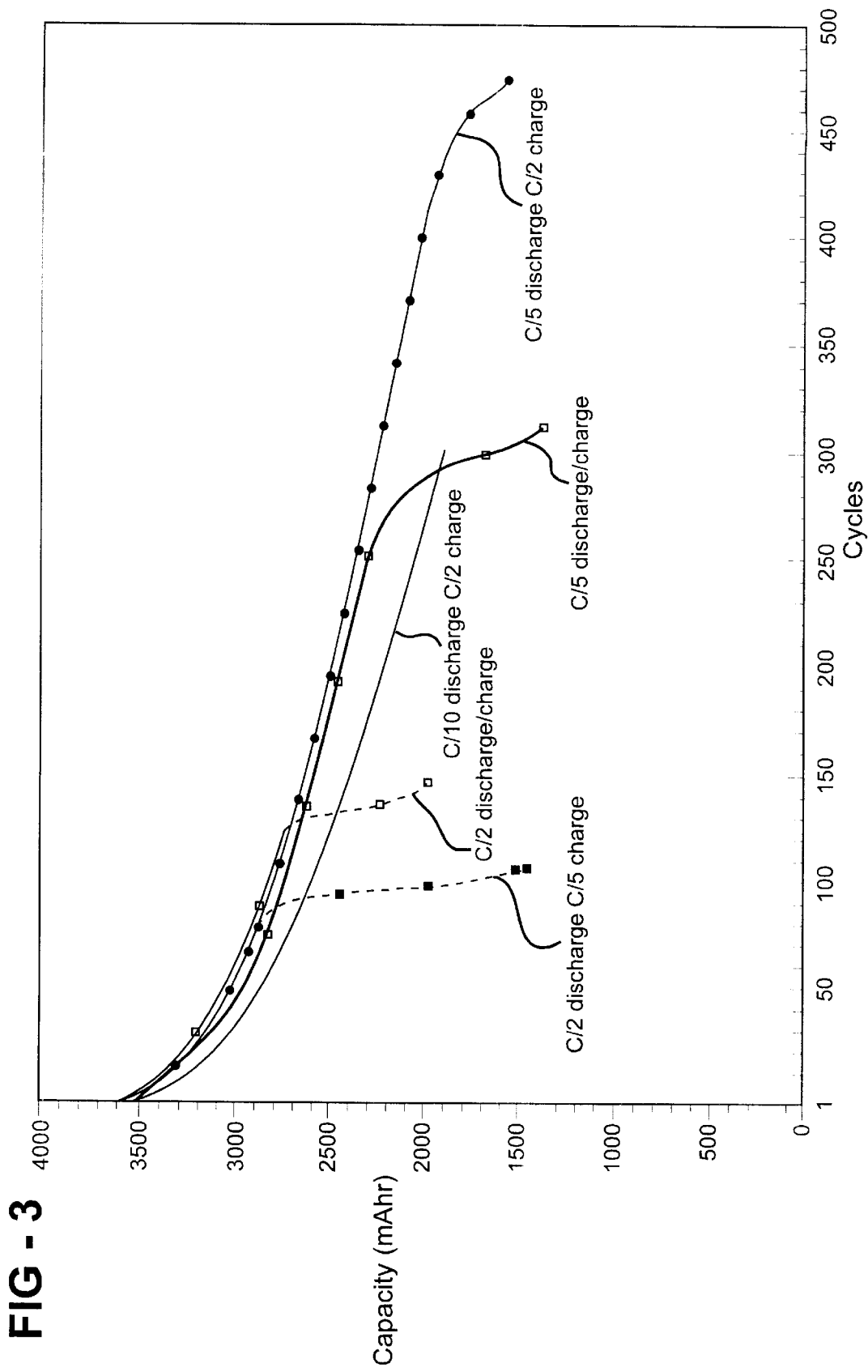
FIG. 3 is a graph showing discharge capacity versus cycles, for the testing of several stacks. The stacks had graphite anode active material and the positive electrode composition is as stated above, based on lithium manganese oxide. The stacks were charged and discharged between about 3.0 and 4.2 volts for up to about 500 cycles. The stacks were cycled at 60° C. with varying charge and discharge rates. The conventional C/2 charge rate and C/2 discharge rate is shown along with other combinations of charge and discharge rates, including: C/2 discharge (about 2 hour discharge) and C/5 charge (about 5 hour charge); C/10 discharge and C/2 charge; C/5 discharge and C/5 charge. Best performance was achieved with a 5 hour discharge rate C/5, and a 2 hour charge rate C/2. In each case, there was additional potentiostatic period at 4.2 volts until current drops to 10% of charge rate.

FIG. 2 is a two-part graph consisting of FIGS. 2A and 2B. FIGS. 2A and 2B show the results of testing a number of cells at the preferred 3.6 volt, 3.7 volt, and 3.75 volt, low voltage cut-off. All other conditions are the same as stated with respect to FIG. 1. The purpose of FIG. 2 was to verify the unexpected and dramatic results obtained with respect to FIG. 1. Here, in FIG. 2, it was verified that elevating the low voltage cut-off point for cyclic operation of the cells did, consistently, provide a significant improvement in cycle life with very little sacrifice in capacity. Again the charge/discharge ratio remained close to unity indicating the excellent reversibility for all cells regardless of voltage cut-off. Referring to Table II, key features ascertainable from FIGS. 1 and 2 are summarized. In Table II, the low voltage cut-off, discharge cut-off voltage is shown along with the available discharge capacity and with the calculated depth of discharge, corresponding to the low voltage cut-off value. It can be seen from Table II that if the cell is cycled to a low voltage discharge condition of 3.0 volts, nominally essentially all of its available capacity is obtainable, nominally 3.1 amps. This represents nominally 100% depth of discharge. If the cell is cycled to a low voltage cut-off of 3.5 volts, thereby sacrificing some of the available capacity, then there is a reduction in capacity of about 0.5 amps. This 3.5 volt cut-off corresponds to about 98% depth of discharge and first cycle capacity derived is 3.05 amps. Moving progressively through the table, at 3.6 volts low voltage (discharge) cut-off, 2.85 amps are derived from the cell corresponding to approximately 91 to 92% depth of discharge. At a low voltage cut-off of about 3.7 volts, 2.75 amps are derived corresponding to a depth of discharge of about 88 to 89%; and at 3.75 volts, 2.65 amps are derived in the first cycle, corresponding to a depth of discharge of between 85 and 86%. When the data of Table II is read in light of the performance seen in FIGS. 1 and 2, it is evident that a small sacrifice in capacity is incurred while significantly extending the life cycle of the cell. This is very important for commercial utilization of lithium ion cells and is a key feature of the cells of the invention rending them very advantageous for commercial use.

A further feature of the invention is the enhancement of life cycle by selecting charge and discharge rates. FIG. 3 shows discharge capacity versus cycles for LMO/graphite cells prepared and conditioned as per the process described with respect to Example I. Then the cells were subjected to extended cycling at the various rates shown in FIG. 3. A cell cycled at the C/2 discharge and C/5 charge condition has a very short life of less than 150 cycles. Remarkably, if these rates are reversed and the cell is discharged at the C/5 rate and charged at the C/2 rate, the cell has a cycle life of over 450 cycles. The traditionally used C/2 charge and C/2 discharge rate shows a relatively short life cycle at less than 200 cycles as compared to the C/5 discharge, C/2 charge rate. Although the C/5 discharge and C/2 charge rates demonstrate a decline in capacity, this decline is modest and the extension in cycle life is very significant. From FIG. 3 it can be seen that when using the conventional C/2 charge and discharge rate, the cell fails at less than 200 cycles. Yet, its capacity is similar to the cell cycled at the preferred C/5 discharge and C/2 charge rate of the invention. Therefore, the preferred five-hour discharge rate and two-hour charge rate of the invention provides a very significant increase in cycle life with very little loss of capacity, compared to conventional cell operation. As can be seen, the slower the rate of discharge, the lesser is the capacity loss.

In order to control the discharge to a voltage level which is relatively high compared to conventional low voltage cut-off on discharge, battery and battery pack protection circuitry is adaptable to the conditions stated herein. Conventional battery protection circuitry provides protection against over-charge, over-discharge, over-voltage, short circuit and high temperature. Conventionally, cells are protected against over-charge to a maximum voltage of on the order of 4.5 volts or over-discharge to below a minimum voltage on the order of 2.0 volts. The respective charge or discharge will be terminated by switching open an FET (Field-Effect-Transistor). Typically, on over-charge the battery or battery pack can be temporarily or permanently disconnected. On over-discharge, a temporary disconnect protects the cells from irreversible degradation in unconventional cells is typically triggered when discharged below 2.0 volts. Such conventional circuitry is adaptable to a higher low voltage cut-off. Appropriate control circuitry is described, for example, in U.S. Pat. No. 5,179,337 (Staarman et al.), 5,557,188 (Piercey), and 5,897,973 (Stephenson et al.), each of which is incorporated by reference in its entirety. Charging at a desired rate is achieved by appropriate circuitry in the aforesaid patents. In addition, charge rate control is described, by way of background in two articles contained in the Proceedings of the Third Annual Portable by Design Conference, Mar. 25–29, 1996, Santa Clara Convention Center, Santa Clara, Calif. "System Considerations for Lithium-Ion Batteries," by N. Lynn Bowen and Dnyanesh Patkar, National Semiconductor Corporation, pp 179–191; and "Characterization of Lithium-Ion Batteries for Fuel Gauging," by Mark Reid and Marc W. Juzkow, Moli Energy 1990 Limited, Maple Ridge, British Columbia, Canada, pp 292–298.

While this invention has been described in terms of certain embodiments thereof, it is not intended that it be limited to the above description, but rather only to the extent set forth in the following claims.

The embodiments of the invention in which an exclusive property or privilege is claimed are defined in the following claims:

What is claimed is:

1. A method of operating a lithium ion battery having a lithium manganese oxide cathode active material, which method comprises:

(a) performing at least one initial conditioning charge and discharge cycle where the conditioning is essentially to the design voltage of the battery and discharge is to essentially full depth of discharge;

(b) charging the conditioned battery of step (a) to essentially full charge; and then (c) discharging the charged battery of step (b) to greater than 90% and less than 100% of the full depth of discharge.

2. The method of claim 1 wherein steps (b) and (c) are repeated in sequence.

3. The method of claim 1 wherein step (c) is conducted to greater than 95% and less than 99% depth of discharge.

4. The method of claim 1 wherein step (b) is conducted to a design voltage in a range of about 4.0 to 4.5 volts.

5. The method of claim 1 wherein step (c) is conducted to a discharge voltage greater than about 3.4 volts, at a temperature of about 50° C. or more.

6. The method of claim 1 wherein step (c) is conducted to a discharge voltage greater than about 3.6 volts, at a temperature of about 60° C. or more.

7. The method of claim 1 wherein the charge of step (b) occurs at a charge rate of C/2.

8. The method of claim 1 wherein the discharge of step (c) occurs at a discharge rate of C/5.

9. The method of claim 1 wherein before step (a) the lithium manganese oxide is nominally $Li_{1+x}Mn_{2-x}O_4$, $0 \leq x \leq 0.20$.

10. A method of operating a lithium ion battery having a lithium manganese oxide cathode active material and an intercalation carbonaceous anode active material, which method comprises:

(a) performing at least one initial conditioning full charge and full discharge cycle, where full charge is to the design voltage of the battery and full discharge corresponds to 100% depth of discharge;

(b) fully charging the conditioned battery of step (a); and (c) discharging the charged battery of step (b) to less than the full depth of discharge.

11. The method of claim 10 wherein before step (a) the lithium manganese oxide is nominally $Li_{1+x}Mn_{2-x}O_4$, $0 \leq x \leq 0.20$.

12. The method of claim 10 wherein each discharged step (c) is conducted until the cell potential is reduced to between about 1% and 10% of the full charge.

13. A method of operating a lithium ion battery having a lithium metal oxide cathode active material, which method comprises:

(a) performing at least one initial conditioning full charge and full discharge cycle, where full charge is to the design voltage of the battery and full discharge corresponds to 100% depth of discharge;

(b) charging the conditioned battery of step (a) at a charge rate of C/2 to achieve up full charge; and (c) discharging the charged battery of step (b) at a discharge rate of C/5 to achieve up to the full depth of discharge.

14. The method of claim 13 wherein before step (a) the lithium metal oxide is nominally $Li_{1+x}Mn_{2-x}O_4$, $0 \leq x \leq 0.20$.

15. The method of claim 13 wherein each discharged step (c) is conducted until the cell potential is reduced to between about 1% and 10% of the full charge.

16. The method of claim 13 wherein the lithium metal oxide is spinel lithium manganese oxide.

17. The method of claim 13 wherein step (c) is conducted at the stated discharge rate to less than the full depth of discharge.

* * * * *